United States Patent [19]

Hoffmann et al.

[11] 4,176,399
[45] Nov. 27, 1979

[54] ANALOG NOISE GENERATOR

[75] Inventors: Jean-Claude Hoffmann; Francis Castanié, both of Toulouse; Henri Crabére, l'Union; Jean-Pierre Verdier, Cazeres; Norbert Voisin, Bruguieres, all of France

[73] Assignee: Societe Nationale Industrielle Aerospatiale, Paris, France

[21] Appl. No.: 898,686

[22] Filed: Apr. 21, 1978

[30] Foreign Application Priority Data

May 6, 1977 [FR] France ................. 77 13883

[51] Int. Cl.² .................. G06F 1/02; H03B 29/00
[52] U.S. Cl. ........................ 364/717; 331/78
[58] Field of Search .................. 364/717; 331/78

[56] References Cited

U.S. PATENT DOCUMENTS

| 3,366,779 | 1/1968 | Catherall et al. | 364/717 |
| 3,706,941 | 12/1972 | Cohn | 331/78 |
| 3,758,873 | 9/1973 | Miller | 331/78 |
| 3,866,029 | 2/1975 | Chevalier | 364/717 |
| 3,946,215 | 3/1976 | May | 364/717 |
| 3,961,169 | 6/1976 | Bishop et al. | 364/717 |

Primary Examiner—Jerry Smith
Attorney, Agent, or Firm—Merriam, Marshall & Bicknell

[57] ABSTRACT

The present invention relates to a binary random noise generator for the stochastic coding of digital or analog information, comprising a comparator having two inputs, one of which receives a reference voltage and the other a random analog noise coming from a source of noise, said comparator supplying at its output a binary signal with random transitions, said generator comprising a clock and a logic system which, on the one hand, effect the sampling of the binary signal with random transitions in synchonism with the frequency of said clock and, on the other hand, ensure the strict equiprobality of the two logic states of said binary signal with random transitions, without increasing the radius of correlation. The invention is more particularly applied to the stochastic coding of information with a view to calculation or transmission, with equidistribution of binary variable.

4 Claims, 11 Drawing Figures

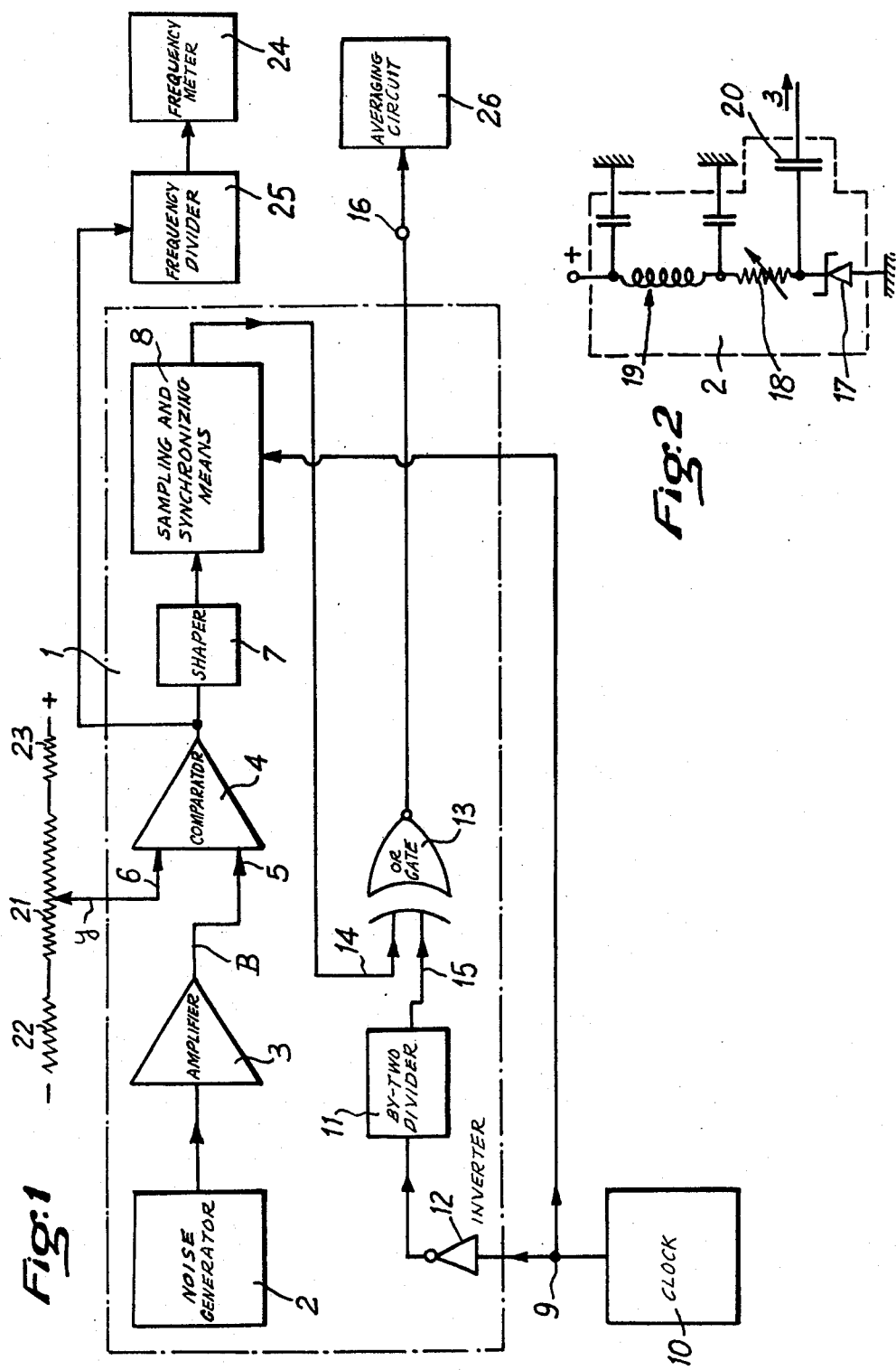

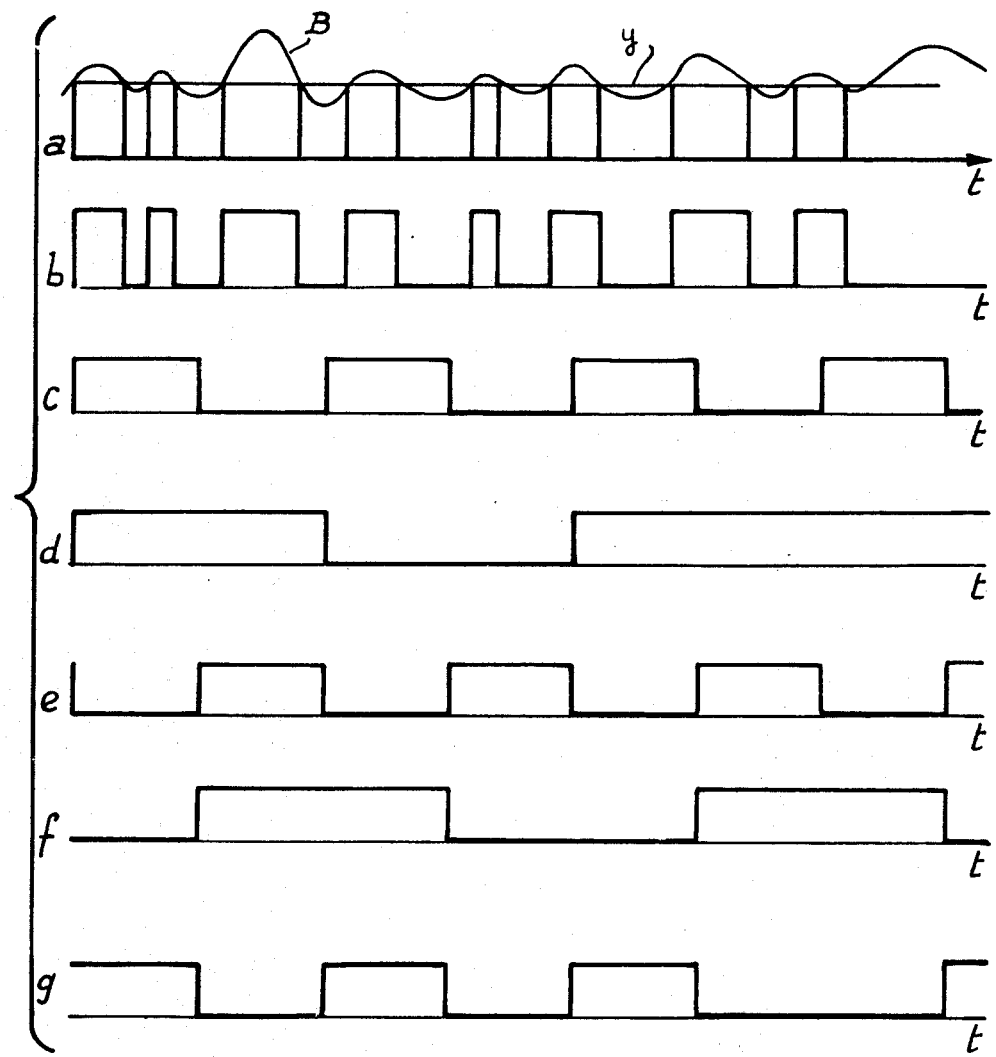

ANALOG NOISE GENERATOR

The present invention relates to the generation of a binary random variable allowing the stochastic coding of analog or digital information.

It is known that the stochastic coding of analog or digital information x consists in making a discrete random variable X whose statistic mean P is equal to X, correspond to this information. A particular application of the principle is the case of X being binary formed of states 0 and 1; in this case, P represents the probability of having 1.

Moreover, it is known that such a stochastic coding is used in certain calculation and data converting devices, as well as for the transmission of information.

Devices for the stochastic coding of analog information are already known which comprise a comparator with two inputs, one of which receives said analog information and the other a random analog noise, coming from a noise generator. Such a noise generator is generally constituted by a source of noise such as a resistor, a noise diode, a Zener diode, etc.

Applicants have noted that it was necessary for the probability P defined hereinabove to be equal to 0.5, with a precision of $10^{-4}$ to $10^{-5}$. Now, such an accuracy cannot be obtained with the known devices.

The invention therefore has for its object a stochastic coding device allowing, in particular, the generation of a binary variable of probability satisfying the above condition in order to be able, for example, to be used on board an aircraft.

To this end, according to the invention, the generator for the stochastic coding of analog information, comprising a comparator with two inputs, of which one receives a reference voltage and the other a random analog noise coming from a source of noise, said comparator supplying at its output a binary signal with random transitions, is noteworthy in that it comprises a clock and a logic system which, on the one hand, effect the sampling of the binary signal with random transitions in synchronism with the frequency of said clock and, on the other hand, ensure the equiprobability of the two logic states of said binary signal with random transitions.

The frequency of the clock is preferably lower than that of the source of noise. For example, the frequency of the clock may be regulated between 500 KHz and 25 MHz, whilst the mean frequency of the source of noise is near 30 MHz.

In an advantageous embodiment, the generator is such that, for sampling the binary signal with random transitions, the logic system comprises a flip flop receiving this signal and that of said clock, whilst, to ensure said equiprobability, the logic system comprises a divider dividing the signal of the clock by two and a logic gate of the exclusive OR type with two inputs, one of them receiving the signal from the by-two divider and the other, the binary signal with random transitions after sampling. A signal reverser is preferably disposed between said clock and either the synchronisation circuit or the by-two divider.

The source of noise may be a resistor, a junction diode or any other known type. However, the source of noise preferably comprises a Zener diode supplied by variable voltage means, and said means are regulated so that the point of functioning of said diode is adjacent the bend in the characteristic thereof.

Between the comparator and the logic system, a device may be provided for shaping the binary signal with random transitions.

Due to the noise generator according to the invention, a device may be obtained for the stochastic coding of analog or digital information, comprising on the one hand such a generator and on the other hand at least one shift register—input in series, outputs parallel—, the input of which is connected to the output of the logic gate, said shift register being synchronised by means of said clock.

In a variant embodiment, a device for the stochastic coding of analog information may comprise a plurality of binary random noise generators according to the invention, the clock, the by-two divider and the signal reverser being common to all of said generators.

The invention will be more readily understood on reading the following description with reference to the accompanying drawings, in which:

FIG. 1 shows a block diagram of a first embodiment of the binary random noise generator according to the invention.

FIG. 2 schematically shows a source of random noise for the generator of FIG. 1.

FIGS. 3a to 3g illustrate the functioning of the noise generator of FIG. 1.

In these Figures, like elements have like references.

Figure 4:
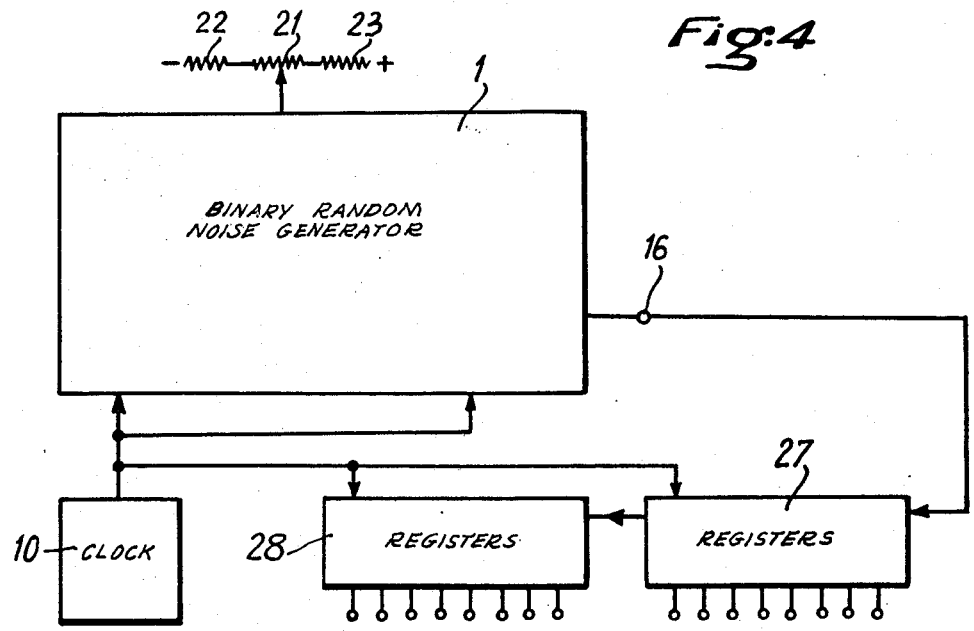
FIG. 4 is a block diagram of a stochastic coding device using the generator of FIG. 1.

Referring now to the drawings, FIG. 1 shows the basic circuit 1 of the stochastic coding device according to the invention, which comprises a source of random noise 2, for example a resistor or junction diode, an amplifier 3 for amplifying the noise B of said source 2, a comparator 4 with two inputs 5 and 6, the first of which receives the noise B and the second a compensating or reference voltage y, a possible shaping device 7 disposed at the output of the comparator 4, a sampling and synchronisation device 8 receiving respectively on its two inputs the signal coming from the device 7 and the signal coming from the output 9 of a clock 10, a by-two divider 11 receiving the signal from the clock 10 via a reverser or inverter 12 and a logic gate 13, of the exclusive OR type, having two inputs 14 and 15 supplied respectively by the outputs of the synchronisation device 8 and the divider 11. The output 16 of the gate 13 forms the output of the basic circuit 1.

As shown in FIG. 2, the source of noise 2 preferably comprises a Zener diode 17 supplied via a potentiometer 18 and possibly a $\pi$ filter 19 and connected to the amplifier 3 by a capacitive connection 20. Such a diode may for example produce a noise B of 30 to 40 mV (peak to peak) with a mean frequency of the order of 30 MHz.

The potentiometer 18 is intended to regulate the point of functioning of the Zener diode 17 in a zone such that its noise has the desired characteristic for the application envisaged:
- a higher mean frequency will be obtained in microplasma working;
- a greater long-term stability will be obtained in uniform avalanche working.

The amplifier 3 may be of the type with integrated videofrequency, for example with a gain of 20 to 30, or may be constituted by a single transistor mounted as amplifier. Other types of amplifiers may also be suitable.

The comparator 4 must present characteristics compatible with the expected performances of the generator, particularly concerning the hysteresis and the duration of the transitions. It is advantageously produced according to the so-called SCHOTTKY technology.

The potentiometer 21 allows the fine adjustment of the zero in order to compare the noise B with the continuous zero and the adjustment of the equiprobability of the binary states of the output signal.

The possible shaping device 7 may be constituted by a simple logic gate of AND or NAND type.

The synchronisation device 8 is advantageously formed by a flip flop, for example capable of tipping to 1 on the coincidence of a rising (or descending) edge of the clock signal and of a 1 of the signal coming from the device 7, then of remaining at 1 for the whole period of clock signal, to re-tip to 0 if, at the end of this period, the signal coming from the device 7 is 0 or remain at 1 if this latter signal is 1.

The divider 11 may also be constituted by a flip flop.

The functioning of the device of FIG. 1 is illustrated with regard to the diagrams a to g of FIG. 3, which represent different signals as a function of time t.

In diagram a is represented the random noise B produced by the source 2 and amplified by amplifier 3, as well as the compensation voltage y. In the comparator 4, the signals B and y are compared and at the output of said comparator or after shaping, at the output of device 7, the binary signal with random transitions of diagram b for example is obtained, such that, if B<y, a logic 0 is obtained, whilst if B>y, a logic 1 is obtained. Thus, due to the comparator 4, a first binary noise B is then obtained.

However, due to the very principle of obtaining the signal of diagram b comparison of signals B and y (diagram a), the signal with binary transitions is formed by a sequence of states 0 or 1 of widths which are generally different and random. In fact, the result of this principle of obtention is that, not only the position and value 0 or 1 of the figures, but also the width thereof is random. To be able subsequently to use the random signal of diagram b, it is desirable that the transitions between states 0 and 1 of the binary signal appear at clock instants.

To this end, in the flip flop 8, the signal with binary transitions of diagram b is sampled at the frequency of the clock 10 (for example equal to 1 MHz). Diagram c shows the signal of clock 10. The result of the sampling, appearing at the output of the flip flop 8, is shown by diagram d. For obtaining this sampled signal, it has been assumed that the output signal of the flip flop 8 passes to 1 when a rising edge of the signal from the clock is in coincidence with a 1 of the signal with binary transitions, remains at 1 during a whole clock period, repasses to 0 when the following rising edge of the clock signal is in coincidence with a 0 of the signal with binary transitions, or remains at 1 when said following rising edge is in coincidence with a 1 of the signal with binary transitions.

After sampling by the flip flop 8, the binary signal of diagram d is therefore obtained. It will be noted that, although different from the signal with binary transitions of diagram b, the binary signal of diagram d remains random since its 0's and its 1's are determined by the variations of said signal with binary transitions.

This is all the more so as the frequency of the clock 10 is lower than or equal to the mean frequency of the noise B. Thus, not only by choice of the clock 10 may one obtain, from a source 2 for example at 30 MHz, a binary signal whose frequency, for example adjustable between 500 KHz and 25 MHz, is adapted to the use envisaged, and which avoids the consequences of forgetting a 0 or a 1 or of the superposition of a parasite. For the binary noise leaving the flip flop 8 to be really random, it is therefore important that the frequency of the clock 10 be lower than the mean frequency of the noise B issuing from the source 2. The frequency of the clock 10 therefore determines the frequency of the binary noise, without altering its random character.

Of course, the frequency of the clock 10 may be provided to be adjustable.

The signal coming from the clock 10 is reversed in the reverser 12, the representation of this signal being shown by diagram e.

The flip flop 11 divides the frequency of the signal of the reverser 12 by two and the diagram f shows the resultant signal applied on the input 15 of the gate 13. Furthermore, said gate receives on its input 14, the sampled signal by flip flop 8 and shown by diagram d. Subsequently the binary random signal appearing at the output 16 of the exclusive OR gate 16 has the appearance as shown in diagram g.

The generator of FIG. 1, whose functioning has just been explained with regard to FIGS. 3a to 3g may supply binary random numbers which are equidistributed, statistically independent from one another and have a maximum flow rate of the order of 25 megabits/second.

To effect adjustment of the noise generator of FIG. 1, a frequency-meter 24 is used, connected to the output of the comparator 4 through frequency divider 25. The frequency-meter 24 indicates the mean frequency of the random transitions of the signal issuing from the comparator. By adjusting the potentiometer 18 (cf. FIG. 2), the zone of functioning of the diode 17 which leads to the maximum frequency is sought. This result may be further improved by adjusting the potentiometer 21 which ensures the centering of the noise with respect to the hysteresis of the comparator 4.

In order to verify the equidistribution of the 0's and the 1's of the binary signal appearing at the output 16 of the generator, i.e. that in a sequence and for a certain time, as many 0's as 1's are obtained an averaging circuit 26 is disposed at said output 16. The averaging circuit 26 enables the mean m of N binary samples $X_i$ appearing on the output 16 to be estimated, i.e. the quantity $$m = \frac{1}{N} \sum_{i=1}^{N} X_i$$

Experience has shown that, for sampling frequencies (clock frequency) lower than 25 MHz, m was equal to 0.5 with a precision of $2 \cdot 10^{-5}$, the number of binary samples N being chosen to be equal to a few millions to avoid the fluctuations of N.

FIG. 4 illustrates a first embodiment of a stochastic coding device comprising a binary noise generator 1 according to the invention, associated with its clock 10. In the device of FIG. 4, the output 16 of the generator 1 is connected to the input of a shift register, for example formed by two registers 27 and 28, mounted in series and synchronised by the clock 10. At the outputs of the registers 27 and 28 is thus obtained a word of n equi-distributed bits, by accumulation of n successive bits in said registers, the number n being equal to the sum of the outputs of the registers 27 and 28.

It will be noted that in the coding device of the FIG. 4, to obtain a noise word of n bits at 1 MHz, it is necessary that the frequency of the clock be equal to n·MHz.

Figure 5:
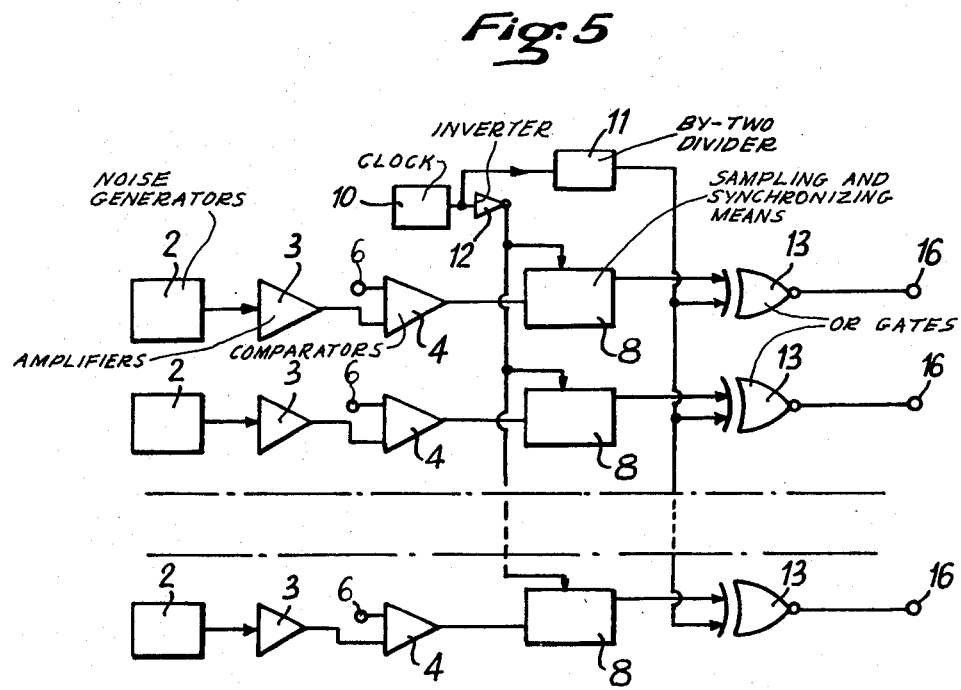
FIG. 5 shows a variant embodiment of a stochastic coding device according to the invention.

In the variant of the coding device of FIG. 5, a noise word of n bits at 1 MHz may be obtained, with a clock frequency of 1 MHz.

This device of FIG. 5 comprises, mounted in parallel, a plurality p of units each comprising the elements 2, 3, 4, 8 and 13 connected as described with reference to FIG. 1. In this case, all the flip flops 8 and all the gates 13 are controlled from a common clock 10, respectively by means of a reverser 12 and a by-two divider 11, also common. Each input 6 of the comparator 4 receives a quantity y elaborated as before by a resistive bridge 21, 22, 23, all the resistive bridges being supplied with the same voltage.

A coding device with p bits in parallel is therefore obtained, of which the functioning, for each of its units, is similar to that explained with regard to FIG. 3.

What we claim is:

1. A binary random noise generator for the stochastic coding of digital or analog information, comprising:
   means for generating a binary signal with random transitions;
   means for sampling said binary signal;
   a clock generating a clock signal;
   means for synchronizing said sampling means by said clock signal;
   a divider dividing said clock signal by two;
   an exclusive OR gate having two inputs, one of said inputs receiving the signal from said by-two divider and the other of said inputs receiving the signal from said sampling means, whereby the output of said exclusive OR gate has a strict equiprobability of its two logic states.

2. A binary random noise generator as claimed in claim 1, wherein said means for generating a binary signal with random transitions comprises a Zener diode supplied by a DC voltage source and means for regulating said voltage source such that said Zener diode functions at a point near a bend in the voltage-current characteristic thereof.

3. A device for the stochastic coding of analog information comprising:
   a binary random noise generator as claimed in claim 1;
   at least one shift register with series input and parallel outputs, said input being connected to the output of said exclusive OR gate; and
   means for synchronizing said shift register by said clock signal.

4. A device for the stochastic coding of digital or analog information, comprising a plurality of binary random noise generators as claimed in claim 1, said generators being arranged in parallel and having a clock and a by-two divider common to all of said generators.

* * * * *